United States Patent
Takeyama

(10) Patent No.: US 10,525,840 B2
(45) Date of Patent: Jan. 7, 2020

(54) FUEL CELL VEHICLE

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 147 days.

(21) Appl. No.: 15/937,642

(22) Filed: Mar. 27, 2018

(65) Prior Publication Data
US 2018/0290560 A1 Oct. 11, 2018

(30) Foreign Application Priority Data
Apr. 7, 2017 (JP) .................. 2017-076460

(51) Int. Cl.
| | | |
|---|---|---|
| *B60L 50/71* | (2019.01) | |
| *B62D 21/15* | (2006.01) | |
| *H01M 8/1018* | (2016.01) | |
| *H01M 8/241* | (2016.01) | |
| *H01M 8/04082* | (2016.01) | |

(52) U.S. Cl.
CPC ............ *B60L 50/71* (2019.02); *B62D 21/155* (2013.01); *H01M 8/1018* (2013.01); *H01M 8/241* (2013.01); *B60Y 2306/01* (2013.01); *H01M 8/04201* (2013.01); *H01M 2008/1095* (2013.01); *H01M 2250/20* (2013.01)

(58) Field of Classification Search
CPC .......... B60L 50/71; B60L 58/33; B60L 50/72; B62D 21/155; B62D 21/00; B60Y 2306/01; Y02T 90/32; Y02T 10/7005; Y02E 60/521; H01M 8/04156; H01M 8/24; H01M 8/241; H01M 8/1018; H01M 2250/20; H01M 2008/1095; H01M 8/04201; H01M 8/04089; H01M 8/04029
See application file for complete search history.

(56) References Cited

U.S. PATENT DOCUMENTS

| | | | | |
|---|---|---|---|---|
| 2015/0027796 | A1* | 1/2015 | Naito | B60K 1/04 180/65.31 |
| 2015/0251560 | A1* | 9/2015 | Ishikawa | B62D 21/15 180/232 |
| 2017/0057550 | A1* | 3/2017 | Sasaki | B62D 21/11 |
| 2017/0096067 | A1* | 4/2017 | Murata | B60K 1/04 |
| 2017/0096172 | A1 | 4/2017 | Nagaosa | |
| 2017/0101031 | A1* | 4/2017 | Ohashi | B60L 50/71 |
| 2017/0297450 | A1* | 10/2017 | Nagaosa | B60H 1/3229 |
| 2018/0123149 | A1* | 5/2018 | Nishiumi | H01M 8/0273 |
| 2018/0170211 | A1* | 6/2018 | Yoshikawa | B60L 11/1896 |
| 2018/0201155 | A1* | 7/2018 | Kozuka | B60L 3/0053 |
| 2019/0214668 | A1* | 7/2019 | Aisima | B60K 1/04 |

FOREIGN PATENT DOCUMENTS

JP 2015-231319 12/2015

* cited by examiner

*Primary Examiner* — Drew J Brown
(74) *Attorney, Agent, or Firm* — Finnegan, Henderson, Farabow, Garrett & Dunner, LLP

(57) ABSTRACT

A bracket has deformation resistant strength set to be overwhelmed by an input load applied to the bracket from a rearward side toward a forward side when a fuel cell vehicle collides with an object.

6 Claims, 8 Drawing Sheets

Fig. 8
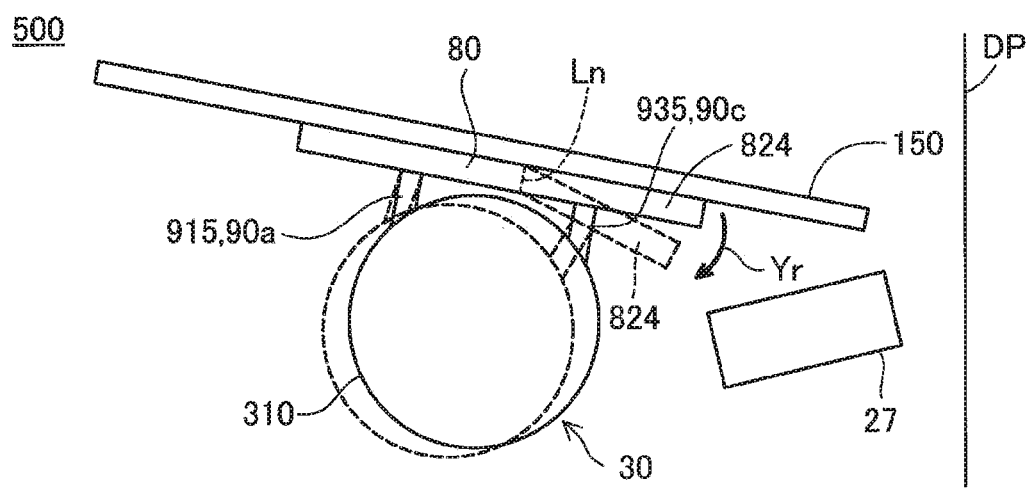

FUEL CELL VEHICLE

CROSS-REFERENCE TO RELATED APPLICATION

The present application claims priority to Japanese Patent Application No. 2017-076460 filed on Apr. 7, 2017, the contents of which are incorporated herein by reference.

BACKGROUND

Field

The present disclosure relates to a technique of a fuel cell vehicle.

Related Art

A conventionally known fuel cell vehicle includes a fuel cell and an auxiliary machine (for example, a compressor) for the fuel cell. The fuel cell is disposed more on a forward side than a dash panel (JP-A-2015-231319).

When the fuel cell vehicle employing the conventional technique collides with an object, the compressor might move toward a rearward side due to the impact of the collision, depending on the position where the auxiliary machine for the fuel cell is disposed. When the compressor moves toward the rearward side, the dash panel might be deformed with a rearward side component (for example, an anode off gas circulation pump), disposed on the rearward side of the compressor, sandwiched between the dash panel and the compressor. Thus, a technique for reducing a risk of deforming the dash panel has been called for.

SUMMARY

According to one aspect of the present disclosure, a fuel cell vehicle is provided. The fuel cell vehicle comprises a dash panel, a fuel cell, a supporting frame configured to support the fuel cell from a downward side, an air compressor disposed below the supporting frame, a bracket that is positioned between the air compressor and the supporting frame and configured to fix the air compressor to the supporting frame, and a rearward side component disposed on a rearward side of the air compressor in a forward and rearward direction of the fuel cell vehicle. The fuel cell, the supporting frame, the air compressor, the bracket, and the rearward side component are disposed on a forward side of the dash panel in the forward and rearward direction. The bracket has deformation resistant strength set to be overwhelmed by an input load applied to the bracket from the rearward side toward the forward side when the fuel cell vehicle collides with an object.

BRIEF DESCRIPTION OF DRAWINGS

FIG. 8 is a second diagram illustrating an effect of the fuel cell vehicle according to the present embodiment.

DETAILED DESCRIPTION

A. Embodiment

Figure 1:
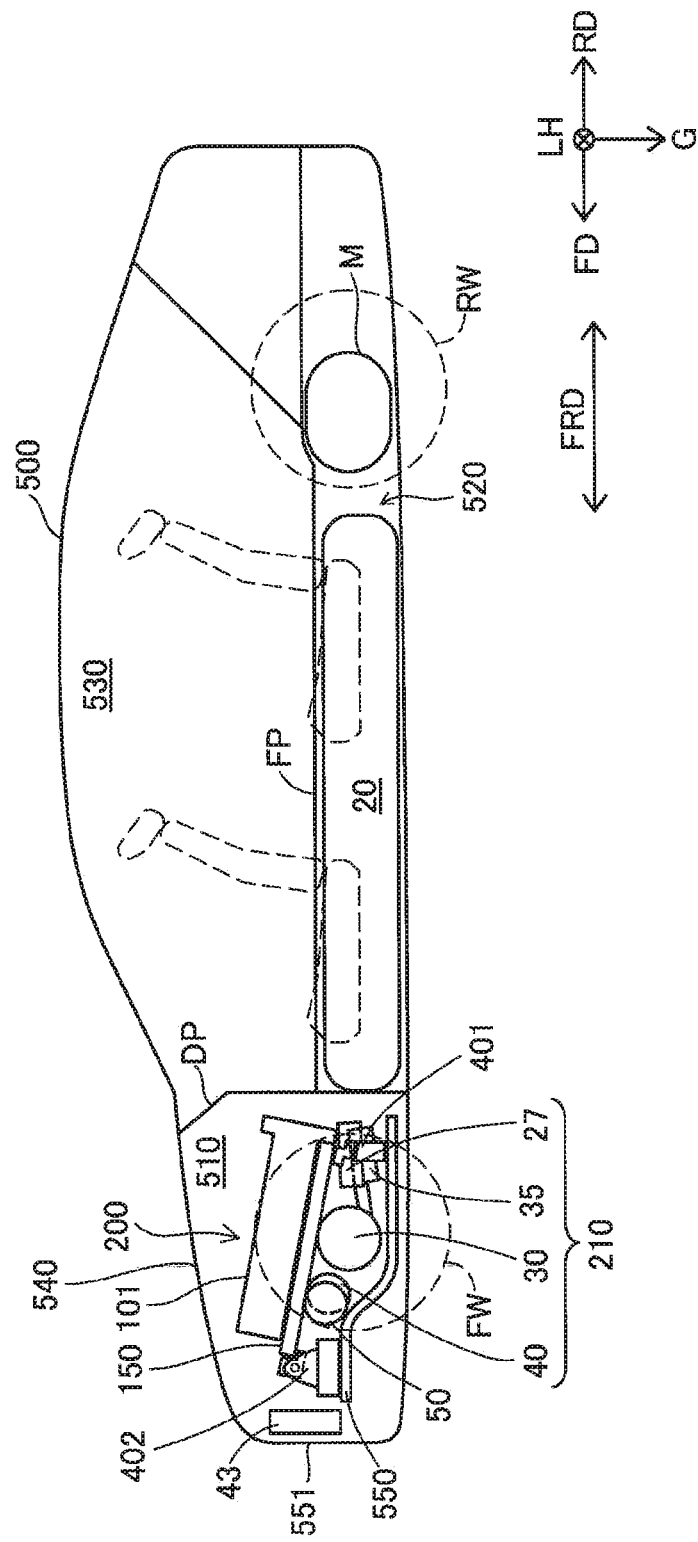
FIG. 1 is a sectional view illustrating a schematic configuration of a fuel cell vehicle according to one embodiment of the present disclosure.

FIG. 1 is a sectional view illustrating a schematic configuration of a fuel cell vehicle 500 according to one embodiment of the present disclosure. Specifically, FIG. 1 is a sectional view along a forward direction and a rearward direction of the fuel cell vehicle 500, respectively toward a forward side FD and a rearward side RD, at a predetermined position in a width direction LH of the vehicle. In the present embodiment, a direction along the forward direction and the rearward direction is referred to as a "forward and rearward direction FRD". In FIG. 1, the width direction LH, the forward direction toward the forward side FD, and the rearward direction toward the rearward side RD of the fuel cell vehicle 500 are defined, and also a vertically downward side G, which is a direction of gravity, is defined. Reference numerals and arrows indicating various directions in FIG. 1 correspond to reference numerals and arrows indicating various directions in other figures. The fuel cell vehicle 500 includes a fuel cell 101, serving as a power source, and has rear wheels RW driven by the driving of a motor M serving as a driving source.

The fuel cell vehicle 500 includes a front room 510, a tank chamber 520, and a cabin 530. The tank chamber 520 and the cabin 530 are partitioned from the front room 510 with a dash panel DP. The tank chamber 520 and the cabin 530 are partitioned from each other with a floor panel FP. The cabin 530, which is a compartment for a passenger, and includes a plurality of seats as illustrated with broken lines in FIG. 1. The cabin 530 is positioned in an area substantially between a pair of front wheels FW and a pair of rear wheels RW. The front room 510 is positioned more on the forward side FD than the cabin 530. The tank chamber 520 is positioned more on the rearward side RD than the front room 510 and is disposed more on the downward side than the cabin 530.

The front room 510 incorporates at least some of components of a fuel cell system 200 including a suspension member 550 and the fuel cell 101. The suspension member 550 is a columnar member disposed more on the downward side than the fuel cell 101 in such a manner as to have the longitudinal direction extending in the forward and rearward direction FRD. Although not elaborated in the figure, another suspension member 550 having substantially the same shape is disposed while being separated from the suspension member 550 described above by a predetermined distance in the width direction LH. Thus, the front room 510 incorporates a pair of suspension members 550 disposed while being separated from each other by a predetermined distance in the width direction LH. The suspension members 550 each have a shape with intermediate portions along the forward and rearward direction FRD bent. The suspension member 550 has an end portion on the rearward side RD fixed to a side member (not illustrated). The side member is a columnar member, having the longitudinal direction extending in the forward and rearward direction FRD, serving as a part of a vehicle frame, that is, the skeleton of the vehicle. The suspension member 550 has an open-end portion on the forward side FD.

The fuel cell 101 and a supporting frame 150 are disposed in the front room 510. The fuel cell 101 is a fuel cell stack formed with a plurality of unit cells stacked one on top of the other. The fuel cell 101 according to the present embodiment is a solid polymer fuel cell. The supporting frame 150 is a plate-shaped member supporting the fuel cell 101 from the downward side. The fuel cell 101 is disposed while being inclined downward toward the rearward side RD in the forward and rearward direction FRD. With the fuel cell 101 thus inclined, water in the fuel cell 101 is collected on the rearward side RD due to the gravity and thus can be easily discharged from the fuel cell 101.

The supporting frame 150 has a rearward side portion attached to the suspension member 550 with a rearward side attachment section 401, and has a forward side portion attached to the suspension member 550 with a forward side attachment section 402. The supporting frame 150 is disposed while being inclined downward toward the rearward side RD in the forward and rearward direction FRD.

The fuel cell system 200 further includes an auxiliary machine 210 that operates with the fuel cell 101 generating power. The auxiliary machine 210 is disposed more on the downward side than the fuel cell 101 and the supporting frame 150, in the front room 510. The auxiliary machine 210 includes rearward side components including an anode off gas circulation pump 27, an air compressor 30, a cooling medium supplying pump 40, and an intercooler 35. The anode off gas circulation pump 27, the air compressor 30, and the cooling medium supplying pump 40 are each attached to the supporting frame 150 via a bracket (not illustrated). The anode off gas circulation pump 27 circulates anode off gas in the fuel cell vehicle 500. The air compressor 30 supplies air, serving as cathode gas, to the fuel cell 101. The cooling medium supplying pump 40 supplies cooling water, serving as a cooling medium, to the fuel cell 101. The intercooler 35 cools the cathode gas with high temperature, sent to the fuel cell 101 from the air compressor 30.

The fuel cell vehicle 500 includes an air conditioner compressor 50 serving as an auxiliary machine for the fuel cell vehicle 500. The air conditioner compressor 50 supplies an air conditioner cooling medium, for an air conditioner installed in the fuel cell vehicle 500, to a heat exchanger (not illustrated). The air conditioner compressor 50 is disposed more on the downward side than the fuel cell 101 and the supporting frame 150, in the front room 510.

Various components of the fuel cell vehicle 500 are disposed more on the forward side FD than the auxiliary machine 210 and the air conditioner compressor 50. The various components include a part of a hood 540, a radiator 43, and a component 551 (for example, a front grill) forming a front surface of the fuel cell vehicle 500.

As described above, the fuel cell 101, the supporting frame 150, the air compressor 30, and the anode off gas circulation pump 27, which is a rearward side component, are disposed on the forward side of the dash panel DP.

The tank chamber 520 accommodates a tank 20 filled with hydrogen gas serving as anode gas. The tank chamber 520 is disposed under the floor of the fuel cell vehicle 500 and at a position more on the rearward side RD than the front room 510. The tank chamber 520 is formed along the forward and rearward direction FRD at a substantially center portion in the width direction LH. The floor panel FP of the cabin 530 defines a ceiling portion of the tank chamber 520. A portion on the floor of the cabin 530 corresponding to the tank chamber 520 protrudes vertically upward beyond the other portions of the floor. Thus, the tank chamber 520 has a shape similar to that of a center tunnel containing a drive shaft in a vehicle including an engine.

Figure 2:
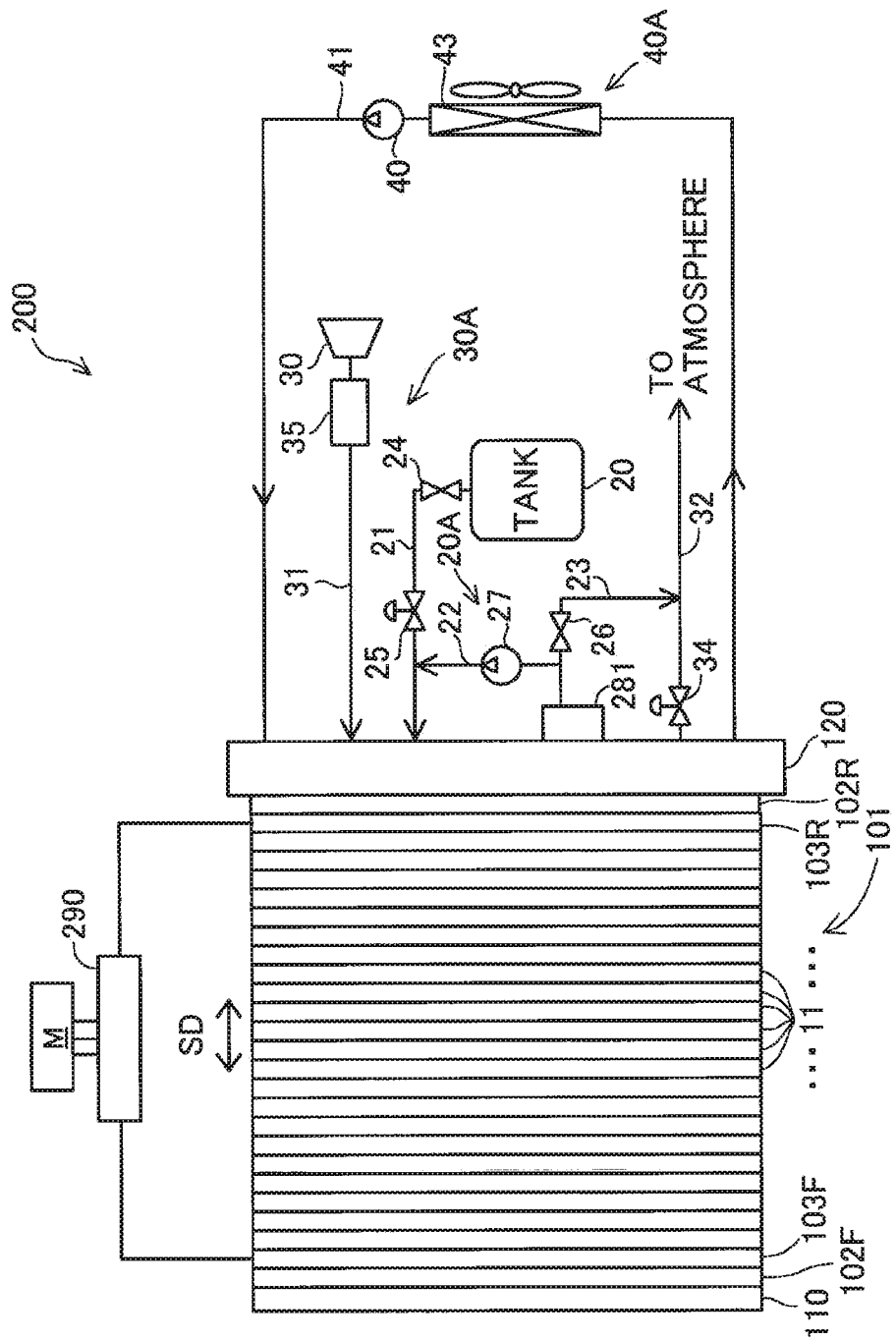
FIG. 2 is a block diagram illustrating a schematic configuration of a fuel cell system.

FIG. 2 is a block diagram illustrating a schematic configuration of the fuel cell system 200. Components (for example, the motor M) that are not the components of the fuel cell system 200 are also illustrated in FIG. 2 for the sake of description. The fuel cell system. 200, including the fuel cell 101 as described above, further includes an anode gas supplying/discharging system 20A, a cathode gas supplying/discharging system 30A, and a cooling medium circulating system 40A.

The fuel cell 101 includes a plurality of unit cells 11 stacked one on top of the other and a pair of end plates 110 and 120 at both end portions of the stack in a stacking direction SD. The end plate 110 is also referred to as a first end plate 110, and the end plate 120 is also referred to as a second end plate 120. The unit cells 11 each generate power through electrochemical reaction between anode gas and cathode gas respectively supplied to an anode side catalyst electrode layer and a cathode side catalyst electrode layer sandwiching a solid polymer electrolyte membrane. In the present embodiment, the anode gas is hydrogen gas and the cathode gas is air. The fuel cell 101 is disposed with the second endplate 120 positioned more on the rearward side RD (FIG. 1) than the first end plate 110. The fuel cell 101 incorporates a manifold (not illustrated), formed along the stacking direction SD of the unit cells 11, for circulating anode gas, anode off gas that is unreacted anode gas not used for the power generation in the fuel cell 101, cathode gas, cathode off gas that is unreacted cathode gas not used for the power generation in the fuel cell 101, and a cooling medium.

The pair of end plates 110 and 120 clamps the stack of the plurality of unit cells 11. The second end plate 120, which is one of the pair of end plates 110 and 120, has a function of supplying the anode gas, the cathode gas, and the cooling medium to the manifold formed in the fuel cell 101, and has a function of providing a flow path for discharging these media. The first end plate 110 does not have such functions. The first endplate 110 and the second endplate 120 each have a substantially plate-like outer shape with its thickness direction matching the stacking direction SD.

The fuel cell 101 includes a pair of current collector plates 103F and 103R electrically connected to a DC-DC converter 290. An insulating plate 102F is disposed between the current collector plate 103F and the first end plate 110. Similarly, an insulating plate 102R is disposed between the current collector plate 103R and the second end plate 120. The DC-DC converter 290, electrically connected to the motor M, raises output voltage from the fuel cell 101, and supplies the resultant voltage to the motor M.

The anode gas supplying/discharging system 20A includes the tank 20 described above, an anode gas supply path 21 as a pipe, a main stop valve 24, a pressure regulating valve 25, an anode off gas circulation path 22 as a pipe, a gas-liquid separator 281, the anode off gas circulation pump 27 described above, an on-off valve 26, and a discharge path 23 as a pipe. The anode gas supply path 21 is connected to the tank 20 and the fuel cell 101. The anode gas supply path 21 is a flow path through which the hydrogen gas in the tank 20 flows to the fuel cell 101. The main stop valve 24 is provided in the anode gas supply path 21 and switched in accordance with an instruction from a controller (not illustrated) so that the supplying of the hydrogen gas from the tank 20 is enabled or disabled. The pressure regulating valve 25 is disposed more on a downstream side than the main stop valve 24 in the anode gas supply path 21. The pressure regulating valve 25 is for adjusting pressure of the anode gas to be supplied to the fuel cell 101 in accordance with an instruction from the controller (not illustrated).

The anode off gas circulation path 22 is a flow path through which the anode off gas, discharged from the fuel cell 101, is recirculated in the anode gas supply path 21. The gas-liquid separator 281 separates liquid from anode off gas containing liquid. Impurity gas, such as nitrogen gas for example, in the anode off gas is separated together with the liquid. The anode off gas circulation pump 27 is disposed more on the downstream side than the gas-liquid separator 281 in the anode off gas circulation path 22. The anode off gas circulation pump 27 supplies the anode off gas discharged from the fuel cell 101 again to the anode gas supply path 21, in accordance with an instruction from the controller (not illustrated). Thus, the anode off gas circulation pump 27 circulates the anode off gas in the fuel cell 101. The on-off valve 26 is provided to the discharge path 23 connected to the cathode gas discharge path 32. The on-off valve 26 transitions to an open state at a predetermined timing, in accordance with an instruction from the controller (not illustrated). Thus, the liquid and the nitrogen gas separated pass through the discharge path 23 and the cathode gas discharge path 32, to be discharged from the system.

The cathode gas supplying/discharging system 30A includes the air compressor 30 described above, the intercooler 35 described above, a cathode gas supply path 31 as a pipe, a cathode gas discharge path 320 as a pipe, and a pressure regulating valve 34. The cathode gas supply path 31 is connected to the fuel cell 101. The cathode gas supply path 31 is a flow path through which external air flows to the fuel cell 101. The air compressor 30 is provided to the cathode gas supply path 31. The intercooler 35 is provided on the downstream side of the air compressor 30 in the cathode gas supply path 31. The cathode gas discharge path 32 is a flow path through which the cathode off gas from the fuel cell 101 is discharged to the outside. The pressure regulating valve 34 is provided to the cathode gas discharge path 32 and has its opening adjusted in accordance with an instruction from the controller (not illustrated). Thus, back pressure on the cathode side of the fuel cell 101 is adjusted.

The cooling medium circulating system 40A includes a cooling medium circulation path 41 as a pipe, the cooling medium supplying pump 40 described above, and the radiator 43. The cooling medium circulation path 41 is a flow path through which a cooling medium (for example, water) for cooling the fuel cell 101 circulates. The cooling medium supplying pump 40 circulates the cooling medium, in the cooling medium circulation path 41, in the cooling medium circulation path 41 and the fuel cell 101 in accordance with an instruction from the controller (not illustrated). Thus, the cooling medium supplying pump 40 supplies the cooling medium to the fuel cell 101. The radiator 43 includes a fan for taking in outer air, and cools the cooling medium in the cooling medium circulation path 41 through heat exchange between the cooling medium and the outer air.

Figure 3:
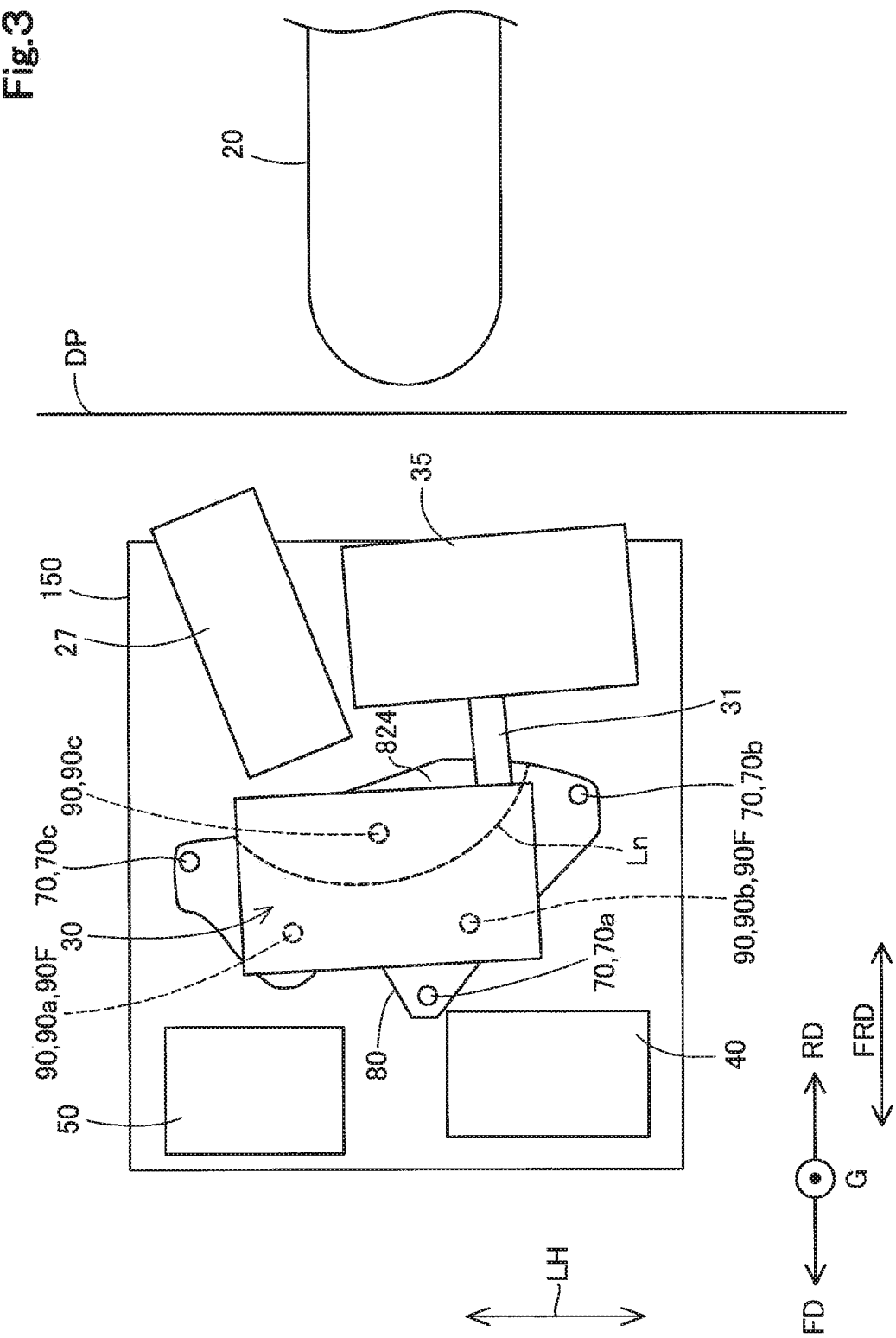
FIG. 3 is a first diagram illustrating positional relationship among components of the fuel cell vehicle.

FIG. 3 is a first diagram illustrating positional relationship among the components of the fuel cell vehicle 500. FIG. 3 is a schematic view of a portion of the fuel cell vehicle 500 on the forward side FD including the front room 510, as viewed from the vertically downward side G.

As illustrated in FIG. 3, the cooling medium supplying pump 40 and the air conditioner compressor 50 are disposed on the forward side FD of the air compressor 30. More specifically, the cooling medium supplying pump 40 is disposed on the forward side FD of the air compressor 30 to be at least partially overlapped with the air compressor 30 when the fuel cell vehicle 500 is viewed from the forward side FD. The air conditioner compressor 50 is disposed on the forward side FD of the air compressor 30 to be at least partially overlapped with the air compressor 30 when the fuel cell vehicle 500 is viewed from the forward side FD. The expression "when the fuel cell vehicle 500 is viewed from the forward side FD" as used in the present embodiment corresponds to a straight front view of the fuel cell vehicle 500. The cooling medium supplying pump 40 and the air conditioner compressor 50 are disposed while being separated from each other in the width direction LH.

The anode off gas circulation pump 27 is disposed on the rearward side RD of the air compressor 30. More specifically, the anode off gas circulation pump 27 is disposed on the rearward side RD of the air compressor 30 to be at least partially overlapped with the air compressor 30 when the fuel cell vehicle 500 is viewed from the forward side FD. A forward side portion of the anode off gas circulation pump 27, including a front end portion, is disposed more on the rearward side RD than a rearward side portion 824 of a bracket 80 described later, in the forward and rearward direction FRD. The rearward side portion 824 may be bent along a line Ln. The anode off gas circulation pump 27 is disposed between the air compressor 30 and the dash panel DP in the forward and rearward direction FRD.

The intercooler 35 is disposed on the rearward side RD of the air compressor 30. More specifically, the intercooler 35 is disposed on the rearward side RD of the air compressor 30 to be at least partially overlapped with the air compressor 30 when the fuel cell vehicle 500 is viewed from the forward side FD. The intercooler 35 is disposed between the air compressor 30 and the dash panel DP in the forward and rearward direction FRD.

The fuel cell vehicle 500 includes the bracket 80 that fixes the air compressor 30 to the supporting frame 150. The bracket 80 is positioned between the air compressor 30 and the supporting frame 150. The bracket 80 has a plate shape and is made of metal such as iron. The bracket 80 is inclined downward toward the rearward side RD in a similar manner as that of the supporting frame 150. The bracket 80 has one surface facing the supporting frame 150 and the other surface facing the air compressor 30. The bracket 80 is fixed to the supporting frame 150 with frame side fixing members 70. Three frame side fixing members 70 are provided in the present embodiment. The air compressor 30 is fixed to the supporting frame 150 with compressor side fixing members 90. Three compressor side fixing members 90 are provided in the present embodiment. The three frame side fixing members 70 are referred to as a forward frame-side fixing member 70a, a first rear frame-side fixing member 70b, and a second rear frame-side fixing member 70c, to be distinguished from each other. The three compressor side fixing members 90 are referred to as a first forward compressor-side fixing member 90a, a second forward compressor-side fixing member 90b, and a rear compressor-side fixing member 90c that serves as a rear fixing member, to be distinguished from each other. The forward frame-side fixing member 70a, the first rear frame-side fixing member 70b, and the second rear frame-side fixing member 70c, having the same configuration, are disposed at different positions. The first forward compressor-side fixing member 90a, the second forward compressor-side fixing member 90b, and the rear compressor-side fixing member 90c, having the same configuration, are disposed at different positions. The first forward compressor-side fixing member 90a serving as a forward fixing member and the second forward compressor-side fixing member 90b serving as a forward fixing member form a forward compressor-side fixing member 90F.

Figure 4:
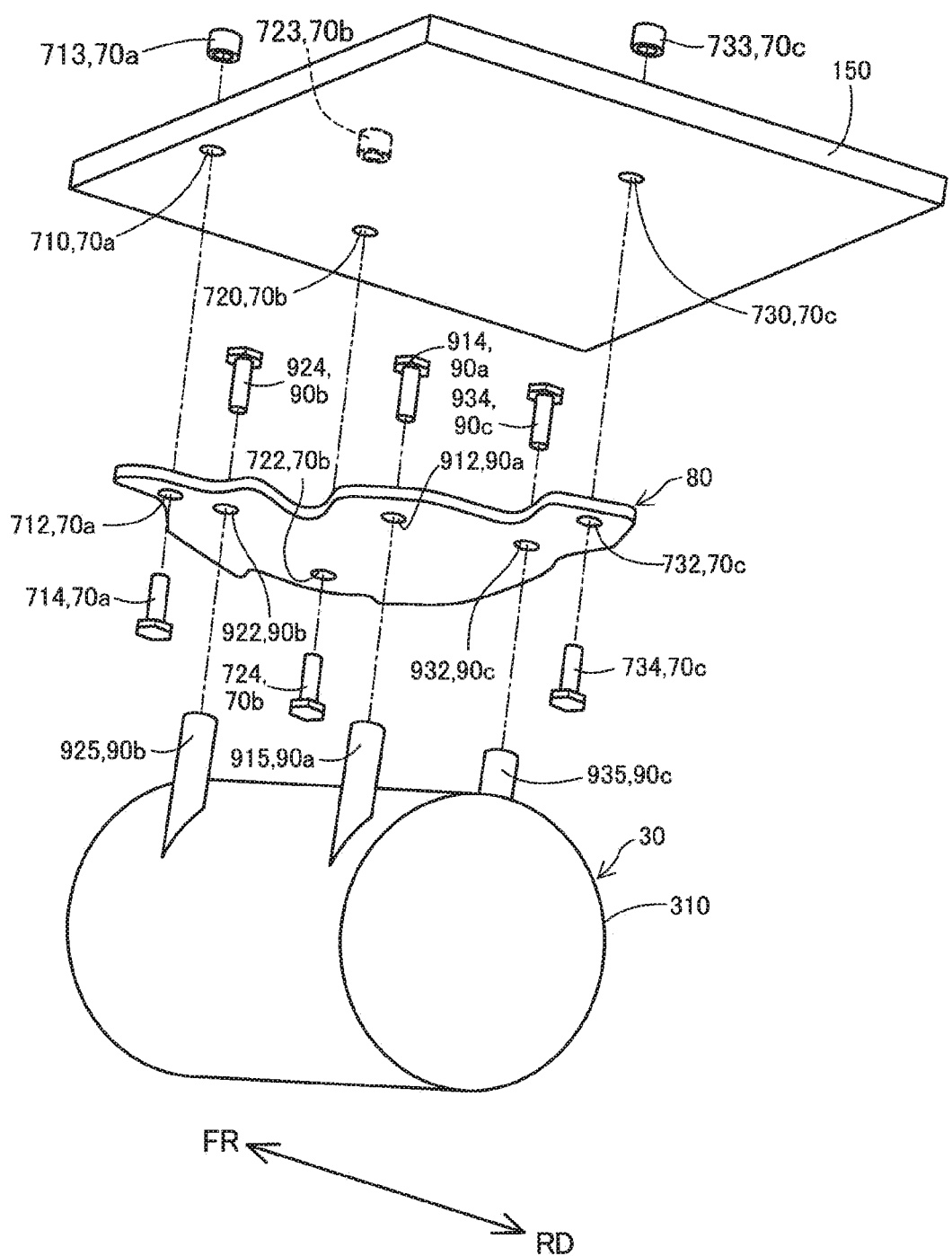
FIG. 4 is a schematic view of a supporting frame, a bracket, and an air compressor.

FIG. 4 is a schematic view of the supporting frame 150, the bracket 80, and the air compressor 30. The first forward compressor-side fixing member 90a fixes the air compressor 30 to the bracket 80 at a position on the forward side FD in the forward and rearward direction FRD. The first forward compressor-side fixing member 90a includes a bolt 914, an insertion hole 912, and a bolt fixing member 915. The bolt 914 is inserted through the insertion hole 912 that is a through hole formed in the bracket 80. The bolt 914 is screwed to the bolt fixing member 915. The bolt fixing member 915 is a cylindrical member provided on a casing 310 of the air compressor 30, and has a threaded inner circumference surface. The casing 310 accommodates various components of the air compressor 30 such as a motor. The air compressor 30 is fixed to the bracket 80 with the bolt 914 screwed to the bolt fixing member 915 while being inserted through the insertion hole 912.

The second forward compressor-side fixing member 90b fixes the air compressor 30 to the bracket 80 at a position on the forward side FD in the forward and rearward direction FRD. The second forward compressor-side fixing member 90b is disposed while being separated from the first forward compressor-side fixing member 90a in the width direction LH. The second forward compressor-side fixing member 90b includes a bolt 924, an insertion hole 922, and a bolt fixing member 925. The bolt 924 is inserted through the insertion hole 922 that is a through hole formed in the bracket 80. The bolt 924 is screwed to the bolt fixing member 925. The bolt fixing member 925 is a cylindrical member provided on the casing 310 of the air compressor 30, and has a threaded inner circumference surface. The air compressor 30 is fixed to the bracket 80 with the bolt 924 screwed to the bolt fixing member 925 while being inserted through the insertion hole 922.

The rear compressor-side fixing member 90c fixes the air compressor 30 to the bracket 80 at a position more on the rearward side RD than the first forward compressor-side fixing member 90a and the second forward compressor-side fixing member 90b in the forward and rearward direction FRD. The rear compressor-side fixing member 90c includes a bolt 934, an insertion hole 932, and a bolt fixing member 935. The bolt 934 is inserted through the insertion hole 932 that is a through hole formed in the bracket 80. The bolt 934 is screwed to the bolt fixing member 935. The bolt fixing member 935 is a cylindrical member provided on the casing 310 of the air compressor 30, and has a threaded inner circumference surface. The bolt fixing member 935 is positioned more on the rearward side RD than the bolt fixing members 915 and 925 in the forward and rearward direction FRD. The air compressor 30 is fixed to the bracket 80 with the bolt 934 screwed to the bolt fixing member 935 while being inserted through the insertion hole 932.

The forward frame-side fixing member 70a fixes the bracket 80 to the supporting frame 150 at a position on the forward side FD in the forward and rearward direction FRD. The forward frame-side fixing member 70a includes an insertion hole 710, an insertion hole 712, a bolt 714, and a nut 713. The bolt 714 is inserted through the insertion hole 710 that is a through hole formed in the supporting frame 150 and through the insertion hole 712 that is a through hole formed in the bracket 80. The bracket 80 is fixed to the supporting frame 150 with the bolt 714 screwed to the nut 713 while being inserted through the insertion holes 710 and 712.

The first rear frame-side fixing member 70b fixes the bracket 80 to the supporting frame 150 at a position more on the rearward side RD than the forward frame-side fixing member 70a in the forward and rearward direction FRD. The first rear frame-side fixing member 70b includes an insertion hole 720, an insertion hole 722, a bolt 724, and a nut 723. The bolt 724 is inserted through the insertion hole 720 that is a through hole formed in the supporting frame 150 and through the insertion hole 722 that is a through hole formed in the bracket 80. The bracket 80 is fixed to the supporting frame 150 with the bolt 724 screwed to the nut 723 while being inserted through the insertion holes 720 and 722.

The second rear frame-side fixing member 70c fixes the bracket 80 to the supporting frame 150 at a position more on the rearward side RD than the forward frame-side fixing member 70a in the forward and rearward direction FRD. The second rear frame-side fixing member 70c is disposed while being separated from the first rear frame-side fixing member 70b in the width direction LH. The second rear frame-side fixing member 70c includes an insertion hole 730, an insertion hole 732, a bolt 734, and a nut 733. The bolt 734 is inserted through the insertion hole 730 that is a through hole formed in the supporting frame 150 and through the insertion hole 732 that is a through hole formed in the bracket 80. The bracket 80 is fixed to the supporting frame 150 with the bolt 734 screwed to the nut 733 while being inserted through the insertion holes 730 and 732.

Figure 5:
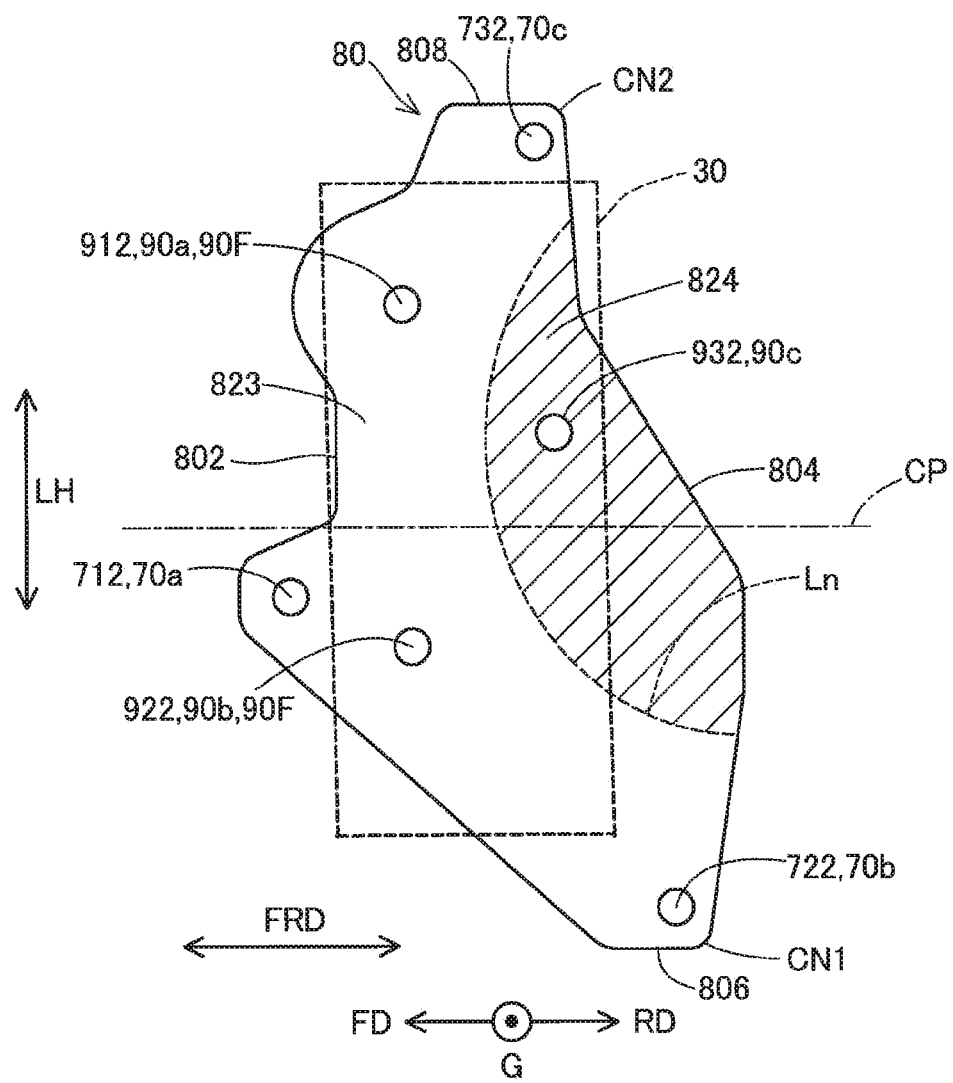
FIG. 5 is a plan view of the bracket as viewed from a vertically downward side.

FIG. 5 is a plan view of the bracket 80 as viewed from the vertically downward side G. An outer shape of the air compressor 30 is illustrated with a broken line in FIG. 5. The configuration of the bracket 80 and the positional relationship between the compressor side fixing member 90 and the frame side fixing member 70 are further described with reference to FIG. 5.

The bracket 80, installed in the fuel cell vehicle 500 (FIG. 1), includes a forward side end portion 802, a rearward side end portion 804, a first outer side end portion 806, and a second outer side end portion 808. The forward side end portion 802, the rearward side end portion 804, the first outer side end portion 806, and the second outer side end portion 808 define outer edges of the bracket 80.

The forward side end portion 802 is an end portion of the bracket 80 on the forward side FD. The forward side end portion 802 faces the forward side FD. The rearward side end portion 804 is an end portion of the bracket 80 on the rearward side RD. The rearward side end portion 804 faces the rearward side RD. The forward side end portion 802 and the rearward side end portion 804 each have an outer shape defined with a plurality of linear and curved shapes. The first outer side end portion 806 is an end portion on one side (right side in the present embodiment) in the width direction LH. The first outer side end portion 806 faces the one side in the width direction LH, and extends substantially along the forward and rearward direction FRD. The second outer side end portion 808 is an end portion on the other side (left side in the present embodiment) in the width direction LH. The second outer side end portion 808 faces the other side in the width direction LH, and extends substantially along the forward and rearward direction FRD.

The forward frame-side fixing member 70a is positioned more on the forward side FD than the air compressor 30. Specifically, the forward frame-side fixing member 70a is positioned close to the forward side end portion 802. The forward frame-side fixing member 70a is positioned close to a center portion CP of the bracket 80 in the width direction LH.

The first rear frame-side fixing member 70b and the second rear frame-side fixing member 70c are positioned more on the rearward side RD than the forward frame-side fixing member 70a in the forward and rearward direction FRD. Specifically, the first rear frame-side fixing member 70b is positioned more on the rearward side RD than the center of the bracket 80 in the forward and rearward direction FRD. Similarly, the second rear frame-side fixing member 70c is positioned more on the rearward side RD than the center of the bracket 80 in the forward and rearward direction FRD. The first rear frame-side fixing member 70b and the second rear frame-side fixing member 70c are positioned more on the outer sides than the forward frame-side fixing member 70a in the width direction LH. Thus, the first rear frame-side fixing member 70b and the second rear frame-side fixing member 70c are disposed at positions on both sides of the forward frame-side fixing member 70a in the width direction LH. The first rear frame-side fixing member 70b and the second rear frame-side fixing member 70c are disposed more on the outer sides than the rear compressor-side fixing member 90c in the width direction LH. The first rear frame-side fixing member 70b is disposed at a position closer to the first outer side end portion 806 that is one outer side end portion than to the center portion CP in the width direction LH. The second rear frame-side fixing member 70c is disposed at a position closer to the second outer side end portion 808 that is the other outer side end portion than to the center portion CP in the width direction LH. In the present embodiment, the first rear frame-side fixing member 70b is disposed close to a corner portion CN1 where the first outer side end portion 806 and the rearward side end portion 804 intersect. The second rear frame-side fixing member 70c is disposed at a position close to a corner portion CN2 where the second outer side end portion 808 and the rearward side end portion 804 intersect.

The first forward compressor-side fixing member 90a and the second forward compressor-side fixing member 90b are positioned to be closer to the forward side end portion 802 than to the rearward side end portion 804. The first forward compressor-side fixing member 90a and the second forward compressor-side fixing member 90b are disposed while being separated from each other in the width direction LH. The rear compressor-side fixing member 90c is positioned closer to the rearward side end portion 804 than to the forward side end portion 802. Thus, the rear compressor-side fixing member 90c is positioned more on the rearward side RD than the first forward compressor-side fixing member 90a and the second forward compressor-side fixing member 90b in the forward and rearward direction FRD. The rear compressor-side fixing member 90c is positioned between the first forward compressor-side fixing member 90a and the second forward compressor-side fixing member 90b in the width direction LH. The forward compressor-side fixing member 90F includes the first forward compressor-side fixing member 90a and the second forward compressor-side fixing member 90b that serve as the forward fixing members. The rear compressor-side fixing member 90c includes a single rear fixing member 90c.

The bracket 80 according to the present embodiment has the following features. The bracket 80 has deformation resistant strength set to be overwhelmed by an input load applied to the bracket 80 from the rearward side RD toward the forward side FD when the fuel cell vehicle 500 collides with an object (for example, forward collision). Thus, the air compressor 30 fixed to the bracket 80 is displaced when the input load is applied to the bracket 80, whereby the anode off gas circulation pump 27 that is a rearward side component can be prevented from being sandwiched between the air compressor 30 and the dash panel DP. This ensures a lower risk of the anode off gas circulation pump 27 deforming the dash panel. Examples of the input load include inertial force applied to the bracket 80 when forward collision of the fuel cell vehicle 500 occurs and external force applied from the anode off gas circulation pump 27 that is one of the rearward side components relatively moving toward the forward side FD due to the impact of the collision. The input load applied to the bracket 80 from the rearward side RD toward the forward side FD when the forward collision of the fuel cell vehicle 500 occurs, may be external force that is large enough to make the supporting frame 150 pushed toward the rearward side RD by a forward side component (for example, the component 551 and the radiator 43 in FIG. 1). For example, the input load may be inertial force applied to the bracket 80 due to the forward collision of the fuel cell vehicle 500 traveling at about 56 km per hour on a still object (for example, a wall) on the forward side. For example, this input load applied to the bracket 80 as inertial force is equivalent to an acceleration load of 100 G (100 times the gravity) applied to the bracket 80.

In the present embodiment, the bracket 80 deforms as follows upon receiving the input load from the rearward side RD toward the forward side FD due to the collision of the fuel cell vehicle 500 on an object. Specifically, the rearward side portion 824 of the bracket 80 including the rearward side end portion 804 is bent, along the line Ln illustrated with the broken line, in a direction toward the vertically downward side G and the forward side FD. Thus, the rearward side portion 824 is deformed to be displaced toward the forward side FD, when the input load is applied to the bracket 80 from the rearward side RD toward the forward side FD. The air compressor 30 is fixed to the rearward side portion 824 by the rear compressor-side fixing member 90c. The forward compressor-side fixing member 90F fixes the air compressor 30 to a portion (a forward side portion 823 described later) of the bracket 80 more on the forward side FD than the rearward side portion 824. The rearward side portion 824 is a hatched area including the rear compressor-side fixing member 90c (more specifically, the insertion hole 932). In the present embodiment, the bracket 80 includes the forward side portion 823 including the forward side end portion 802 and the rearward side portion 824 including the rearward side end portion 804. The forward side portion 823 is an area between the position of the forward compressor-side fixing member 90F and the forward side end portion 802 in the forward and rearward direction FRD. The rearward side portion 824 is an area positioned more on the rearward side RD than the forward side portion 823 in the forward and rearward direction FRD.

The strength of the rear compressor-side fixing member 90c is set to be lower than the strength of the forward compressor-side fixing member 90F. In the present embodiment, the rear compressor-side fixing member 90c is a single member, whereas the forward compressor-side fixing member 90F includes the first forward compressor-side fixing member 90a and the second forward compressor-side fixing member 90b. Thus, the strength of the rear compressor-side fixing member 90c is set to be lower than the strength of the forward compressor-side fixing member 90F.

Figure 6:
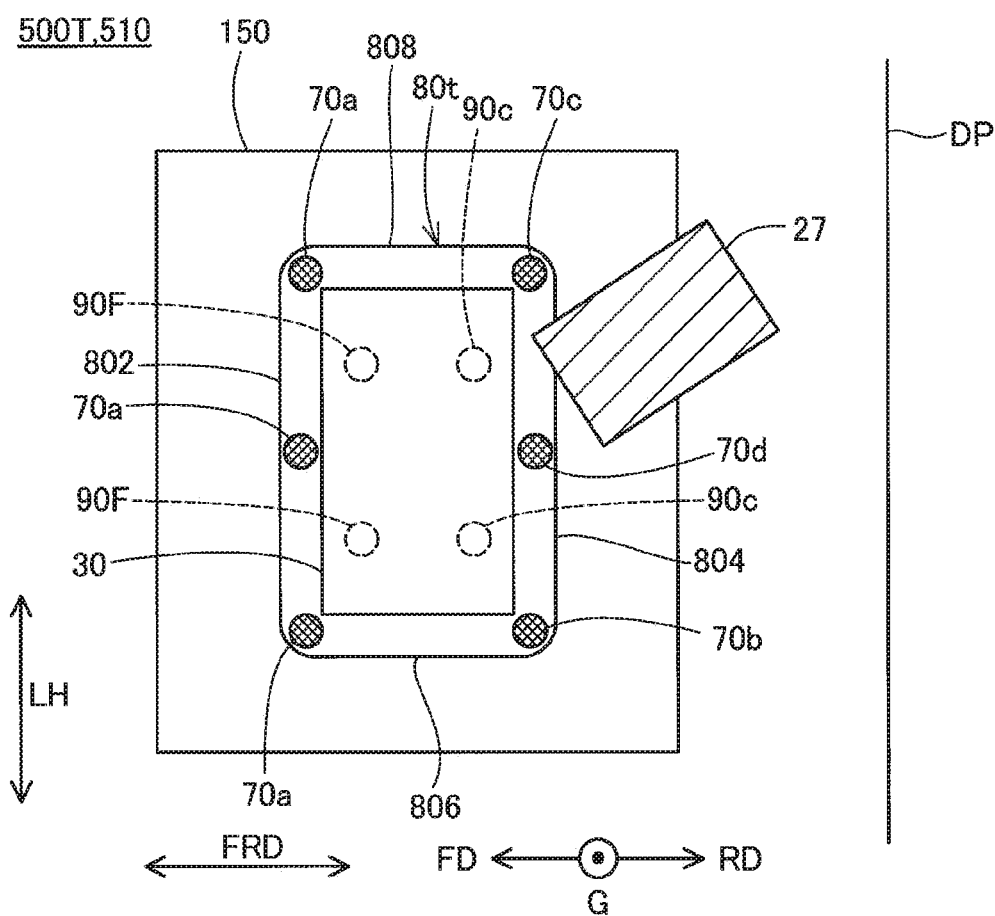
FIG. 6 is a diagram illustrating a fuel cell vehicle according to a reference example.

FIG. 6 is a diagram illustrating a fuel cell vehicle 500T according to a reference example. FIG. 6 is a schematic view of a portion of the fuel cell vehicle 500T on the forward side FD including the front room. 510 as viewed from the vertically downward side G. This example is different from the embodiment described above in that a bracket 80t has deformation resistant strength set to overwhelm an input load applied to the bracket 80t from the rearward side RD toward the forward side FD when the fuel cell vehicle 500T collides with an object. Specifically, the fuel cell vehicle 500T includes three forward frame-side fixing members 70a arranged along the forward side end portion 802. The fuel cell vehicle 500T includes the first rear frame-side fixing member 70b and the second rear frame-side fixing member 70c, and further includes a third rear frame-side fixing member 70d at the center of the rearward side end portion 804 in the width direction LH. Two rear compressor-side fixing members 90c are disposed while being separated from each other in the width direction LH. The other configurations are the same as those of the fuel cell vehicle 500. Thus, the same or similar components are denoted with the same reference numerals, and will be omitted in the description as appropriate.

When forward collision of the fuel cell vehicle 500T occurs, a forward side component (for example, the component 551 and the radiator 43 illustrated in FIG. 1) positioned on the forward side FD of the supporting frame 150 moves toward the rearward side RD due to the impact of the collision. Thus, the supporting frame 150 is pushed by the forward side component to move toward the rearward side RD. The bracket 80t has deformation resistant strength overwhelming the input load to the bracket 80t as a result of the forward collision, due to the third rear frame-side fixing member 70d and the two rear compressor-side fixing members 90c. Thus, the bracket 80t moves toward the rearward side RD without deforming. As a result, the air compressor 30 also moves toward the rearward side RD, whereby the anode off gas circulation pump 27 that is the rearward side component might be sandwiched by the air compressor 30 and the dash panel DP. Thus, the dash panel DP might be pushed by the anode off gas circulation pump 27 toward the rearward side RD to be deformed.

Figure 7:
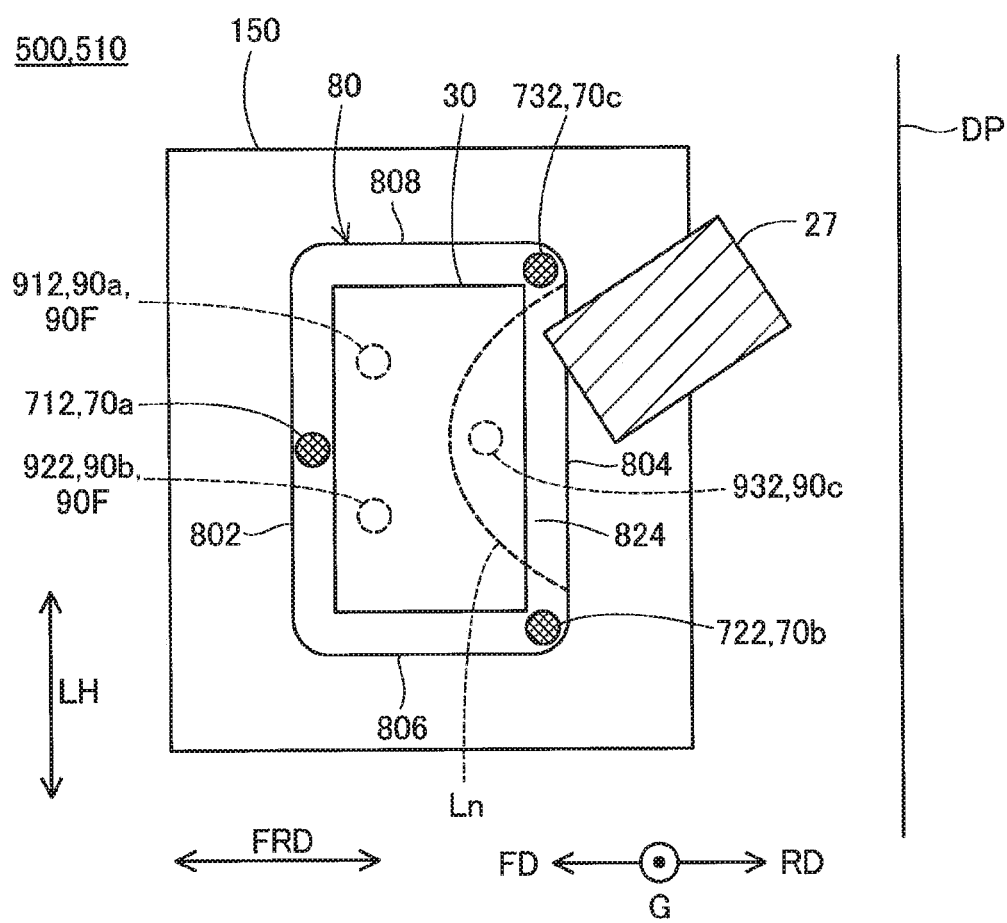
FIG. 7 is a first diagram illustrating an effect of the fuel cell vehicle according to the present embodiment.

FIG. 7 is a first diagram illustrating an effect of the fuel cell vehicle 500 according to the present embodiment. FIG. 8 is a second diagram illustrating an effect of the fuel cell vehicle 500 according to the present embodiment. FIG. 7 is a schematic view of a portion of the fuel cell vehicle 500 on the forward side FD including the front room. 510 as viewed from the vertically downward side G. FIG. 8 is a schematic view of the supporting frame 150, the bracket 80, and the air compressor 30, as viewed from a left side of the fuel cell vehicle 500. In FIG. 7, the bracket 80 has a rectangular shape in plan view for the sake of description.

When the forward collision of the fuel cell vehicle 500 occurs, the forward side component (for example, the component 551 and the radiator 43 illustrated in FIG. 1) positioned on the forward side FD of the supporting frame 150 moves toward the rearward side RD due to the impact of the collision. Thus, the supporting frame 150 is pushed by the forward side component to move toward the rearward side RD. The rearward side portion 824 of the bracket 80 bends in the direction toward the vertically downward side G and the forward side FD, as indicated by an arrow Yr in FIG. 8, along the line Ln due to inertial force as a result of the forward collision of the fuel cell vehicle 500. Thus, the rearward side portion 824 thus bent in the direction toward the vertically downward side G and toward the forward side FD is displaced toward the forward side FD. As a result, the air compressor 30 fixed to the rearward side portion 824 is also displaced toward the forward side FD. Thus, the gap between the air compressor 30 and the dash panel DP in the forward and rearward direction FRD is less likely to be small. This ensures a lower risk of the anode off gas circulation pump 27 that is the rearward side component being sandwiched between the air compressor 30 and the dash panel DP. All things considered, a risk of the dash panel DP deforming due to the anode off gas circulation pump 27 colliding with the dash panel DP can be reduced.

In the embodiment described above, the strength of the rear compressor-side fixing member 90c is set to be lower than the strength of the forward compressor-side fixing member 90F. Thus, the rearward side portion 824 of the bracket 80 can easily deform to be displaced toward the forward side FD, when the input load is applied to the bracket 80. This ensures a lower risk of the anode off gas circulation pump 27 being sandwiched between the air compressor 30 and the dash panel DP, whereby a risk of the dash panel DP being deformed by the anode off gas circulation pump 27 can be reduced.

In the embodiment described above, the forward compressor-side fixing member 90F includes a plurality of forward fixing members, whereas the rear compressor-side fixing member 90c includes a single rear fixing member 90c. Thus, the strength of the rear compressor-side fixing member 90c can be easily set to be lower than the strength of the forward compressor-side fixing member 90F.

In the embodiment described above, the plurality of rear frame-side fixing members 70b and 70c are positioned more on the outer sides than the rear compressor-side fixing member 90c in the width direction LH of the fuel cell vehicle 500. With this configuration, the rearward side portion 824 including the rear compressor-side fixing member 90c can be easily formed.

In the embodiment described above, the first rear frame-side fixing member 70b and the second rear frame-side fixing member 70c are disposed at positions closer to the outer side end portions 806 and 808 than to the center portion CP of the bracket 80 in the width direction LH. Thus, the rearward side portion 824 can be formed as an area including the center portion CP of the bracket in the width direction LH.

B. Modifications

The present embodiment is not limited to the examples and embodiments described above, and can be implemented in various forms without departing from the gist of the present disclosure. For example, the following modifications may be employed.

B-1. First Modification:

The forward frame-side fixing member 70a, which is a single member in the embodiment described above (FIG. 5), may include a plurality of members. A rear fixing member that fixes the bracket 80 to the supporting frame 150 may be provided in addition to the first rear frame-side fixing member 70b and the second rear frame-side fixing member 70c. This rear fixing member is disposed close to the outer side end portions 806 and 808. Also with this configuration, the rearward side portion 824 can deform to be displaced toward the forward side FD when the input load such as inertial force is applied to the bracket 80 due to the collision of the fuel cell vehicle 500 as in the embodiment described above.

B-2. Second Modification:

In the embodiment described above, the rear compressor-side fixing member 90c is provided as a single member so that the deformation resistant strength of the bracket 80 is set to be overwhelmed by the input load. However, this should not be construed in a limiting sense. More than one rear compressor-side fixing members 90c may be disposed, and the strength at the line Ln, along which the bracket 80 is bent, may be set to be lower than the strength of the other portions of the bracket 80 for example. For example, a portion along the line Ln may be formed to be thinner than the other portions so that the rearward side portion 824 can deform to be displaced toward the forward side FD when the input load is applied to the bracket 80.

B-3. Third Modification:

The rearward side component, which is the anode off gas circulation pump 27 in the embodiment described above, may be another component of the fuel cell vehicle 500. For example, the rearward side component may be the cooling medium supplying pump 40 or the air conditioner compressor 50.

The present disclosure is not limited to the embodiments, the examples, and the modifications described above, and may be implemented in various ways without departing from the gist of the present disclosure. Some technical features that are not described as being essential herein can be omitted as appropriate. The present disclosure may be implemented by aspects described below.

(1) According to one aspect of the present disclosure, a fuel cell vehicle is provided. The fuel cell vehicle comprises a dash panel, a fuel cell, a supporting frame configured to support the fuel cell from a downward side, an air compressor disposed below the supporting frame, a bracket that is positioned between the air compressor and the supporting frame and configured to fix the air compressor to the supporting frame, and a rearward side component disposed on a rearward side of the air compressor in a forward and rearward direction of the fuel cell vehicle. The fuel cell, the supporting frame, the air compressor, the bracket, and the rearward side component are disposed on a forward side of the dash panel in the forward and rearward direction. The bracket has deformation resistant strength set to be overwhelmed by an input load applied to the bracket from the rearward side toward the forward side when the fuel cell vehicle collides with an object. According to this aspect, the bracket deforms upon receiving the input load due to collision of the fuel cell vehicle against an object. Thus, the air compressor fixed to the bracket is displaced, whereby a risk of the rearward side component being sandwiched between the air compressor and the dash panel can be reduced. Thus, the dash panel can be prevented from being deformed by the rearward side component.

(2) In the above-described aspect, the bracket may include a rearward side portion to which the air compressor is fixed, the rearward side portion including a rearward side end portion, the rearward side portion deforming to be displaced toward the forward side when the input load is applied to the bracket. According to this aspect, the rearward side portion of the bracket deforms to be displaced toward the forward side, when the input load is applied to the bracket due to the collision of the fuel cell vehicle against an object. Thus, the rearward side portion and the air compressor fixed to the rearward side portion are displaced toward the forward side, whereby a risk of the rearward side component being sandwiched between the air compressor and the dash panel can be reduced. Thus, the dash panel can be prevented from being deformed by the rearward side component.

(3) In the above-described aspect, the fuel cell vehicle may further comprise a forward compressor-side fixing member configured to fix the air compressor to a portion of the bracket that is more on the forward side than the rearward side portion in the forward and rearward direction, and a rear compressor-side fixing member configured to fix the air compressor to the rearward side portion of the bracket at a position more on the rearward side than the forward compressor-side fixing member in the forward and rearward direction, and the rear compressor-side fixing member may have strength set to be lower than strength of the forward compressor-side fixing member. According to this aspect, the rear compressor-side fixing member has strength set to be lower than strength of the forward compressor-side fixing member. Thus, the rearward side portion of the bracket can be easily deformed to be displaced toward the forward side when the input load is applied to the bracket. Thus, a risk of the rearward side component being sandwiched between the air compressor and the dash panel can be reduced, whereby the dash panel can be prevented from being deformed by the rearward side component.

(4) In the above-described aspect, the forward compressor-side fixing member may include a plurality of forward fixing members that are disposed while being separated from each other in a width direction of the fuel cell vehicle, and configured to fix the air compressor to the bracket, and the rear compressor-side fixing member may include a single rear fixing member configured to fix the air compressor to the bracket. According to this aspect, the forward compressor-side fixing member includes a plurality of forward fixing members, whereas the rear compressor-side fixing member includes a single rear fixing member. Thus, the strength of the rear compressor-side fixing member can be easily set to be lower than the strength of the forward compressor-side fixing member.

(5) In the above-described aspect, the fuel cell vehicle may further comprise a forward frame-side fixing member configured to fix the bracket to the supporting frame, and a plurality of rear frame-side fixing members configured to fix the bracket to the supporting frame at positions more on the rearward side than the forward frame-side fixing member in the forward and rearward direction, and the plurality of rear frame-side fixing members may be disposed more on outer sides than the rear compressor-side fixing member in a width direction of the fuel cell vehicle. According to this aspect, the plurality of rear frame-side fixing members are positioned more on the outer sides than the rear compressor-side fixing member in the width direction of the fuel cell vehicle. Thus, the rearward side portion can be easily formed to deform to be displaced toward the forward side when the input load is received.

(6) In the above-described aspect, the plurality of rear frame-side fixing members may be disposed at positions close to an outer side end portion than to a center portion of the bracket in the width direction. According to this aspect, the rearward side portion can be formed as an area including a center portion of the bracket in the width direction of the fuel cell vehicle.

The present disclosure can be implemented in various aspects other than the fuel cell vehicles described above. For example, the present disclosure can be implemented in such aspects as a method for manufacturing a fuel cell vehicle and a structure in which an auxiliary machine for a fuel cell is disposed.

What is claimed is:

1. A fuel cell vehicle comprising:
    a dash panel;
    a fuel cell;
    a supporting frame configured to support the fuel cell from a downward side;
    an air compressor disposed below the supporting frame;
    a bracket that is positioned between the air compressor and the supporting frame and configured to fix the air compressor to the supporting frame; and a rearward side component disposed on a rearward side of the air compressor in a forward and rearward direction of the fuel cell vehicle, wherein the fuel cell, the supporting frame, the air compressor, the bracket, and the rearward side component are disposed on a forward side of the dash panel in the forward and rearward direction, and the bracket has deformation resistant strength set to be overwhelmed by an input load applied to the bracket from the rearward side toward the forward side when the fuel cell vehicle collides with an object.

2. The fuel cell vehicle in accordance with claim 1, wherein the bracket includes a rearward side portion to which the air compressor is fixed, the rearward side portion including a rearward side end portion, the rearward side portion deforming to be displaced toward the forward side when the input load is applied to the bracket.

3. The fuel cell vehicle in accordance with claim 2 further comprising:

a forward compressor-side fixing member configured to fix the air compressor to a portion of the bracket that is more on the forward side than the rearward side portion in the forward and rearward direction; and a rear compressor-side fixing member configured to fix the air compressor to the rearward side portion of the bracket at a position more on the rearward side than the forward compressor-side fixing member in the forward and rearward direction, wherein the rear compressor-side fixing member has strength set to be lower than strength of the forward compressor-side fixing member.

4. The fuel cell vehicle in accordance with claim 3, wherein the forward compressor-side fixing member includes a plurality of forward fixing members that are disposed while being separated from each other in a width direction of the fuel cell vehicle, and configured to fix the air compressor to the bracket, and the rear compressor-side fixing member includes a single rear fixing member configured to fix the air compressor to the bracket.

5. The fuel cell vehicle in accordance with claim 3 further comprising:

a forward frame-side fixing member configured to fix the bracket to the supporting frame; and a plurality of rear frame-side fixing members configured to fix the bracket to the supporting frame at positions more on the rearward side than the forward frame-side fixing member in the forward and rearward direction, wherein the plurality of rear frame-side fixing members are disposed more on outer sides than the rear compressor-side fixing member in a width direction of the fuel cell vehicle.

6. The fuel cell vehicle in accordance with claim 5, wherein the plurality of rear frame-side fixing members are disposed at positions close to an outer side end portion than to a center portion of the bracket in the width direction.

* * * * *